(12) United States Patent
Al Khafaji et al.

(10) Patent No.: US 11,755,292 B2
(45) Date of Patent: *Sep. 12, 2023

(54) PIPELINE MANAGEMENT TOOL

(71) Applicant: Palantir Technologies Inc., Palo Alto, CA (US)

(72) Inventors: Salar Al Khafaji, Amsterdam (NL); Sebastiaan Visser, Utrecht (NL)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,560

(22) Filed: Dec. 21, 2021

(65) Prior Publication Data

US 2022/0113948 A1   Apr. 14, 2022

Related U.S. Application Data

(63) Continuation of application No. 16/056,952, filed on Aug. 7, 2018, now Pat. No. 11,221,831.

(60) Provisional application No. 62/543,544, filed on Aug. 10, 2017.

(51) Int. Cl.
| | |
|---|---|
| G06F 8/34 | (2018.01) |
| G06F 8/36 | (2018.01) |
| G06F 8/41 | (2018.01) |
| G06F 3/04842 | (2022.01) |
| G06F 9/451 | (2018.01) |

(52) U.S. Cl.
CPC ............ *G06F 8/34* (2013.01); *G06F 3/04842* (2013.01); *G06F 8/36* (2013.01); *G06F 8/433* (2013.01); *G06F 8/4452* (2013.01); *G06F 9/451* (2018.02)

(58) Field of Classification Search
CPC ... G06F 8/34; G06F 9/451; G06F 8/36; G06F 8/433; G06F 3/04842; G06F 8/4452
See application file for complete search history.

(56) References Cited

U.S. PATENT DOCUMENTS

| | | |
|---|---|---|
| 8,493,406 B2 | 7/2013 | Rubin et al. |
| 10,681,176 B1 * | 6/2020 | Lewis ................... G06F 8/60 |
| 11,221,831 B1 | 1/2022 | Al Khafaji et al. |
| 2005/0235274 A1 | 10/2005 | Mamou |
| 2006/0241924 A1 * | 10/2006 | Harper ............... G06N 3/126 |
| | | 703/7 |
| 2011/0214106 A1 | 9/2011 | Qi |
| 2013/0103677 A1 | 4/2013 | Chakra |
| 2014/0189666 A1 | 7/2014 | Krig |
| 2016/0098037 A1 | 4/2016 | Zornio |
| 2016/0328406 A1 | 11/2016 | Convertino |

(Continued)

OTHER PUBLICATIONS

Official Communication for U.S. Appl. No. 15/977,666 dated Apr. 11, 2019.

*Primary Examiner* — S. Sough
*Assistant Examiner* — Cheneca Smith
(74) *Attorney, Agent, or Firm* — Sheppard Mullin Richter & Hampton LLP

(57) ABSTRACT

Systems, methods, and non-transitory computer readable media are provided for managing pipelines of operations on data. A system may access data and provide a set of functions for the data. The system may receive a user's selection of one or more functions from the set of functions. The system may generate a pipeline of operations for the data based on the user's selection. The pipeline of operations may include the function(s) selected by the user.

20 Claims, 6 Drawing Sheets

(56) References Cited

U.S. PATENT DOCUMENTS

| | | |
|---|---|---|
| 2016/0358101 A1 | 12/2016 | Bowers et al. |
| 2016/0358102 A1 | 12/2016 | Bowers et al. |
| 2016/0358103 A1 | 12/2016 | Bowers et al. |
| 2018/0349508 A1 | 12/2018 | Bequet et al. |

* cited by examiner

PIPELINE MANAGEMENT TOOL

CROSS REFERENCE TO RELATED APPLICATIONS

This application is a continuation application of U.S. patent application Ser. No. 16/056,952, filed Aug. 7, 2018, which claims the benefit under 35 U.S.C. § 119(e) of the U.S. Provisional Application Ser. No. 62/543,544 filed Aug. 10, 2017, the content of which is hereby incorporated by reference in its entirety.

FIELD OF THE INVENTION

This disclosure relates to approaches for managing pipelines of operations on data.

BACKGROUND

Under conventional approaches, users may code pipelines that include multiple operations on data. For example, users may wish to create a pipeline that includes multiple modifications/processes on the data. Identifying and integrating previously written operations into new pipelines may be difficult. Users may be required to manually search for previously written operations and/or recode the operations. Modifying orders of operations within the pipeline may be difficult. Additionally, traditional coding tools may not allow users to run individual operations within the pipeline separately to check the accuracy of the code/results. Debugging the code of the pipelines and verifying individual operations on the data may be time consuming and resource intensive.

SUMMARY

Various embodiments of the present disclosure may include systems, methods, and non-transitory computer readable media configured to manage pipelines of operations on data. A system may access data and provide a set of functions for the data. The system may receive a user's selection of one or more functions from the set of functions. The system may generate a pipeline of operations for the data based on the user's selection. The pipeline of operations may include the function(s) selected by the user. The pipeline of operations for the data may include a modification operation or a visualization operation on at least a portion of the data.

In some embodiments, the set of functions for the data may be provided based on at least a portion of the data. In some embodiments, the set of functions may provide at least one of a modification operation or a visualization operation for the data. A type of the modification operation or the visualization operation may be determined based on at least a portion of the data.

In some embodiments, providing the set of functions for the data may include suggesting the set of functions. The set of functions may be suggested based on at least a portion of the data or a historical usage of the set of functions.

In some embodiments, providing the set of functions for the data may include displaying a pipeline creation interface. The pipeline creation interface may enable the user to search for existing functions and create new functions.

In some embodiments, the pipeline creation interface may enable the user to (1) view and modify code for a given function, and (2) view a result of applying the given function on the data.

In some embodiments, the pipeline creation interface enabling the user to create the new functions may include suggesting a data type for a variable of a given new function based on the variable.

In some embodiments, the system may receive the user's grouping of multiple functions from the set of functions. The system may generate a new function based on the multiple functions.

In some embodiments, the system may receive a change to a given function from the set of functions. The given function may be used in one or more related functions. The system may generate a dependency graph for the change to the given function. The system may provide information regarding an impact of the change to the given function on the related function(s) based on the dependency graph. The system may change the related function(s) based on the change to the given function.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
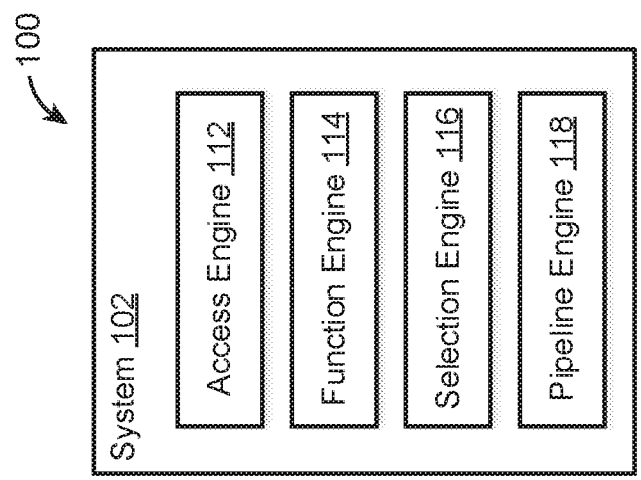
FIG. 1 illustrates an example environment for managing pipelines of operations on data, in accordance with various embodiments

A claimed solution rooted in computer technology overcomes problems specifically arising in the realm of computer technology. In various implementations, a system may access data and provide a set of functions for the data. The set of functions for the data may be provided based on one or more criteria (e.g., one or more portions of the data, user input). The system may receive a user's selection of one or more functions from the set of functions. The system may receive the user's grouping of multiple functions from the set of function, and generate a new function based on the multiple functions. The system may generate a pipeline of operations for the data based on the user's selection. A pipeline of operations may refer to one or more sequences of multiple operations. A pipeline of operations may include operations (e.g., functions) that take as their input(s) the output(s) of a prior operation and/or operations that provide their output(s) as input(s) to a subsequent operation. For example, an operation within a pipeline of operation may take as its primary input the output of the previous operation in the pipeline and/or may provide its output as a primary input to the next operation in the pipeline. Outputs of individual operations may be passed through the pipeline as inputs to the following operations. The pipeline of operations may include the function(s) selected by the user. The pipeline of operations for the data may include one or more modification operations and/or one or more visualization operations on one or more portions of the data.

The set of functions for the data may be provide via a pipeline creation interface. The pipeline creation interface may enable the user to search for existing functions and create new functions. The pipeline creation interface may enable the user to (1) view and modify code for a given function, and (2) view a result of applying the given function on the data. A change to a given function from the set of functions may be received. The given function may be used in one or more related functions. A dependency graph for the change to the given function may be generated. Information regarding an impact of the change to the given function on the related function(s) may be provided based on the dependency graph. The related function(s) may be changed based on the change to the given function.

The approaches disclosed herein enable management/customization of pipelines of operations on data. The approaches disclosed herein provide an interface that enables users to search for existing functions, create new functions, modify functions, select functions for operations on data, see results of applying individual functions on data, modify selections of functions (e.g., add, remove, change order of functions), and/or create/modify pipelines of operations on data. Impact of modifying functions on related function may be provided to users and changes to functions may be propagated to related functions. One or more external functions (e.g., visualization function) may be provided for use through the interface, giving users flexibility to use functions from external libraries.

FIG. 1 illustrates an example environment 100 for managing pipelines of operations on data, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. As shown in FIG. 1, in various embodiments, the computing system 102 may include an access engine 112, a function engine 114, a selection engine 116, a pipeline engine 118, other engines, and/or other components. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the access engine 112 is configured to access data. Accessed data may include data for which one or more operations are desired. Data may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). In some embodiments, data may be stored in one or more databases/datastores. Data may be stored within a single file or across multiple files.

For example, the access engine 112 may access data relating to one or more groups of vehicles (e.g., consumer vehicles, commercial vehicles, passenger vehicles, delivery vehicles). The data relating to the groups(s) of vehicles may be organized using one or more particular structures. For example, the data may be organized as one or more tables/data frames, with values relating to the group(s) of vehicles being stored within a particular location (e.g., row, column) within the table(s) based on the characteristics to which the values relate. For example, information relating to individual trips taken by the vehicles may be separated into separate rows (or columns) and individual characteristics relating to the trips (e.g., vehicle identifier, vehicle operator, departure location, current location, destination, average speed, maximum speed, current speed, direction of travel, weight, elevation, distance traveled, time traveled, time of trip, fuel consumed, type/amount of load, sensor readings) may be separated into separate columns (or rows). While the disclosure is described herein with respect to data relating to group(s) of vehicles, this is merely for illustrative purposes and is not meant to be limiting. Other types/organizations of data are contemplated.

In various embodiments, the function engine 114 is configured to provide one or more sets of functions for the data. A function may refer to one or more groupings of code that perform one or more specific operations on data. A set of functions may refer to a grouping of one or more functions. Operations on data may include processes that modify the data (e.g., change the data, create new data based on the data, delete the data, combine the data with other data), processes that visualize the data (e.g., in a plot, in a table, in a chart, in a map), and/or other operations of the data. In some embodiments, functions provided by the function engine 114 may be specific to the data (e.g., the type of data accessed), the user (e.g., the type of user, user's access level), the use-case (e.g., project-based functions), and/or other information. The functions provided by the function engine 114 may be selected by users to generate one or more pipelines of operations on the data. For example, the accessed data may be transformed into different shapes of data in a single step or in multiple steps based on users' selection of functions provided by the function engine 114.

In some embodiments, the function engine 114 may provide functions within one or more libraries. A library may include a collection of functions and the function engine 114 may provide the collection of functions based on availability of the library. In some embodiments, the function engine 114 may provide access to external functions. For example, visualization functions (e.g., providing visual representations of data in a plot, in a table, in a chart, in a map) may be provided by the function engine 114 based on importing the relevant library (or relevant portion of the library) including the visualization functions. As another example, a given visualization function may be provided by the function engine 114 based on the function engine 114 sending one or more portions of the data (the input data) to an external process/library that processes the data according to the visualization function and returns the results of the visualization operation to the function engine 114. Providing access to external functions may give users greater flexibility in selecting functions for pipelines, may allow users to use external functions within pipelines without coding the external functions themselves, and/or may allow users to offload one or more portions of the pipelines' processes to external resources (e.g., external function, external library, external computing system).

The set(s) of functions for the data may be provided through one or more interfaces (e.g., users interface(s), application program interface(s)). For example, a user interface may provide a listing of functions available to operate on the data. The user interface may include a search field enabling users to search for particular functions. Users may use the search field to search for particular functions based on names of functions, keywords of functions, operations performed by functions, and/or other information relating to functions. For example, a set of functions for data may include a Greater Than function that takes in two arguments. A first argument may define the portion of data (e.g., a row/column, a portion of a row/column) to be compared to a threshold value, and the second argument may define the threshold value. One or both of the arguments may be determined based on one or more outputs of a prior operation. Users may find the Greater Than function from the set of functions by entering the term "greater" or similar terms in the search field. Responsive to users' entering of the appropriate term (e.g., "greater") in the search field, the user interface may display the Greater Than function, along with other functions that match the entered term with their names, keywords, operations, and/or other information related to the functions.

In some embodiments, the set(s) of functions for the data may be provided based on one or more portions of the data. The function engine 114 may identify the types of operations that may be performed on the data or portion(s) of the data, and provide the identified functions. For example, a first data may include sufficient information to utilize a histogram visualization operation, while a second data may include sufficient information to utilize a histogram visualization operation, a scatter plot visualization operation, a wind rose chart visualization operation, and a map visualization operation. Based on access of the first data, the function engine 114 may provide via the interface(s) the histogram visualization operation. Based on access of the second data, the function engine 114 may provide via the interface(s) the histogram visualization operation, the scatter plot visualization operation, the wind rose chart visualization operation, and the map visualization operation. In some embodiments, the function engine 114 may provide other (general) functions that are applicable across multiple types of data, such as a Sort function (e.g., sorting alphabetically/numerically, based on time/date).

As another example, the interface(s) providing the functions may allow users to select one or more portions of the data (e.g., a particular row/column, a particular portion of a row/column). The function engine 114 may identify the types of operations that may be performed on the selected portion(s) of the data and may provide the identified functions. For example, the accessed data may include tabular data (information organized into rows and column), with different types of information included in different rows/columns. Based on users' selection of a particular row/column, the function engine 114 may identify the types of operations that may be performed on the selected portion(s) of the data/the types of data, and provide the identified functions. For example, a tabular data may include a first column of numerical values and a second column of string values. Based on different types of data in the first column and the second column, the function engine 114 may identify and provide different functions for the first column and the second column. For example, based on users' selection of the first column, the function engine 114 may provide via the interface(s) modification/visualization operation(s) relating to numerical values (e.g., numerical operators, numerical plots). Based on users' selection of the second column, the function engine 114 may provide via the interface(s) modification/visualization operation(s) relating to string values (e.g., language operators). In some embodiments, the function engine 114 may also other (general) functions that are applicable across multiple types of data, such as a Column/Row Operator function (e.g., removing/moving column/row). Provision of other types of functions based on portion(s) of data are contemplated.

In some embodiment, the functions identified for data/portion(s) of data may be tied to one or more characteristics of data types. Referring to the example above of the first column including numerical values, the function engine 114 may identify different functions for the numerical values based on the characteristics of the numerical values within the selected portion. For example, based on the numerical values of the selected portion being of a particular measurement standard (e.g., metric system), an identified function may include a Conversion function to covert the values to a different measurement standard (e.g., standard system). Referring to the example above of the second column including string values, the function engine 114 may identify different functions for the string values based on the characteristics of the string values. For example, based on the string values of the selected portion being of a particular language (e.g., English), an identified function may include a Conversion function to covert the values to a different language (e.g., Spanish). Provision of other types of functions based on characteristics of data types are contemplated.

In some embodiments, providing the set(s) of functions for the data may include suggesting the set(s) of functions. Suggesting a set of functions may include ranking/prioritizing the more likely to be used functions above the less likely to be used functions. The set of functions may be suggested based on at least a portion of the data or a historical usage of the set of functions. For example, the function engine 114 may list the identified functions in the order of importance/likely usage based on the data type within the selected portion and/or based on frequency of prior usage of given functions (with respect to the accessed data, similar data, similar pipeline). In some embodiments, the set of functions may be provided with the number of times the same/similar function has been used for the accessed data/portion of the data, similar data, and/or similar pipelines.

In some embodiments, providing the set(s) of functions for the data may include suggesting one or more parameters for the set(s) of functions. For example, referring to the example of the Greater Than function, providing the Greater Than function may include suggesting one or more parameters for the arguments of the Greater Than function. For example, the function engine 114 may suggest one or more particular portions (e.g., rows/columns) which may be selected as the portion of data to be compared to a threshold value and/or may suggest one or more particular values to be selected as the threshold value. In some embodiments, the parameters suggested for a given function may change based on users' selection other parameters for the given function. For example, referring to the example of the Greater Than function, the threshold value suggested by the function engine 114 may change based on the portion of the data to which the threshold value will be compared (e.g., different threshold value suggested based on the compared data being speed versus distance traveled). The function engine 114 may suggest different values for the threshold value based on the portion of the data selected by users for comparison.

In some embodiments, particular functions may be provided/suggested based on users' selection of one or more given functions and/or one or more given parameters for given function(s). For example, a dataset A may be frequently used with dataset B for a given function, and based on users' selection of the dataset A to be used for the given function, the function engine 114 may suggest the use of the dataset B for another argument/parameter of the given function. As another example, a function B may frequently follow the use of a function A, and based on users' selection of the function A for operation on the data, the function engine 114 may suggest the use of the function B for operation on the data. In some embodiments, one or more functions/parameters may be suggested based on ordering of functions/parameters selected by users.

In some embodiments, an interface through which set(s) of functions are provided may include a pipeline creation interface. The pipeline creation interface may include one or more features and/or enable one or more functions of interfaces discussed above. The pipeline creation interface may provide views (e.g., listings) of functions. The pipeline creation interface may provide views of functions within one or more libraries, and may allow users to select/import/export the relevant libraries. The listing of functions may be used by users to select one or more functions for operation on data. The pipeline creation interface may provide views of code for the functions. For example, based on a user's selection of a given function, the pipeline creation interface may enable the user to see the code that have been written to accomplish the given function. The pipeline creation interface may enable the user to view a result of applying the given function on the data. The pipeline creation interface may provide views of data before and after application of one or more functions/operations on the data (e.g., before and after data transformation). Such views may provide previews of applying the functions on the data and may allow users to run individual functions/operations to check the accuracy of the corresponding code/results. The pipeline creation interface may enable users to modify the code for functions. Thus, the pipeline creation interface may facilitate users' debugging of code of functions/operations and verification of individual functions/operations in an intuitive and timely manner.

In some embodiments, the pipeline creation interface may enable users to search for existing functions and create new functions. In some embodiments, the pipeline creation interface may require users to first search for functions before allowing the users to create functions. For example, a user may wish to perform a Great Than operation on a portion of data. The user may be required to use a search field (as discussed above) to first search for a function (e.g., entering "greater" in the search field). Responsive to the user's input of value in the search field, the function engine 114 may provide a list of matching functions and provide an option to create a new function. If the user does not find the desired function among the listed functions, the user may use the create new function option to code the desired operation. Requiring the user to search for functions before allowing the user to create new function may reduce the likelihood of users recoding existing functions.

In some embodiments, the pipeline creation interface may suggest one or more data types for variables of a new function and/or a modified function. A user creating a new function/modifying an existing function may provide a variable for the function, and the pipeline creation interface may suggest one or more datatypes for the variable based on how the variable is identified in the code. For example, a user may be creating the Greater Than function, and may define a variable for the second argument (threshold value) as "Num." Based on the identification of the variable as "Num," the function engine 114 may determine that the variable desired is likely a numerical value and may set/suggest the data type of the variable as a number type. This setting of the data type may be used to determine the portion of the data/user input which may be used as the variable when the function is selected for use—that is the variable being a number type may be used to filter out portion(s) of the data including string values and suggest portion(s) of the data including numerical values, or may be used to request a numerical value from users when running the function.

In some embodiments, the pipeline creation interface may enable users to define the structure of data which may be used for a given variable. For example, for individual variables defined within the code for a given function, the pipeline creation interface may provide options (e.g., buttons, fields) through which the users may define whether the corresponding data may be found within a column, a numerical column, a string column, a row, a numerical row, a string row, a box, a numerical box, a string box, and/or other structures.

In some embodiments, the pipeline creation interface may enable users to restrict or provide flexibility in selection of data/parameters for arguments in a given function when the given function is run. For example, the pipeline creation interface may enable users to restrict the use of a given function to a particular data type (e.g., limited to use on speed data) or a particular value (e.g., a predefined value), or may enable the data type to be operated on/parameter to be used to be selected at the time of use (e.g., when the function is run, users may be required to select the data type to be operated on by the function/to select the value).

In some embodiments, a new function may be generated based on multiple functions. For example, the pipeline creation interface may enable users to select multiple functions (within a library, within a listing of functions selected by the users) and generate a new function based on the selected functions. The code for the new function may be automatically generated based on the code of the selected functions. The code for the new function may include raw code of the selected functions or references to the underlying code of the selected functions. In some embodiments, the raw code of the new functions may be updated based on changes to the underlying code of the selected functions.

In some embodiments, one or more dependency graphs may be used to keep track of changes to a given function and determine the impact of the change to the given function on related functions. Related functions may refer to functions that depend/call on the given function (e.g., the code of the related functions reference the given function; the code of the related functions are updated based on changes to the code of the given function). Based on a change to the code of the given function (e.g., received through the pipeline creation interface), a dependency graph for the change may be generated. The dependency graph may be used to track how changes to code of a given functions are propagated to other functions. Information regarding the impact of the change to the given function on the related function(s) may be provided based on the dependency graph. For example, before changes to the given function are finalized, the user may be provided with a warning indicating that the changes to the given function will impact other functions and/or analysis using the given function/other functions. For example, the warning may identify the related functions/analysis or providing a summary of the related functions/analysis (e.g., number of related functions/analysis). In some embodiments, the warning may include links and/or options that allow users to see a listing of the related functions that will be affected by the change and/or see how those changes in the related functions will change operations on the data (see previews of the change in data operations of the related functions). Users may be provided with options to (1) reject the change (e.g., restore the code of the given function to its prior state), (2) accept the change (e.g., overwrite the previous version of the code of the given function), and change the related function(s), and/or (3) store the changed code as a new function. In some embodiments, one or more version controls may be used to keep track of different versions of functions.

In various embodiments, the selection engine 116 is configured to receive a user's selection of one or more functions from the set(s) of functions. The user's selection of function(s) may be received through one or more interfaces (e.g., users interface(s), application program interface(s)). For example, the selection engine 116 may receive the user's selection of the function(s) based on the user's interaction with a user interface. The selection engine 116 may receive the user's selection of one or more functions based on a user's searching for particular functions (e.g., searching for a given function and selecting one of the listed functions). The selection engine 116 may receive the user's selection of one or more functions created/modified by the user (e.g., through the pipeline creation interface). The selection engine 116 may receive the user's selection of one or more functions provided based on the data/portion(s) of the data. The selection engine 116 may receive the user's selection of a function generated based on a combination of multiple functions. Other selections of functions are contemplated.

In some embodiments, the selection engine 116 may provide information (e.g., warnings) based on improper/incomplete selection of functions and/or data for the selected functions. For example, a user may have selected a particular visualization function to map the routes taken by multiple vehicles. However, the portions of the data (e.g., columns, rows of data) selected by the user to provide location information for the visualization operation may not include sufficient information to provide visualization of the routes of the vehicles. For example, the portions of the data selected by the user may include information on the vehicles' current locations but may not include information on where the vehicles were located in the past. Based on the data not including sufficient information for the selected function, the selection engine 116 may provide a warning that the selected function cannot be performed because the function was not provided with sufficient data. In some embodiments, the selection engine 116 may identify the missing data so that the user may change the data for which the function is applied and select the needed data for the function. In some embodiments, the selection engine 116 may change the selected function to a similar function that is supported by the selected data. For example, based on the selected data missing information on where vehicles were located in the past but including information on the vehicles' current locations, the selection engine 116 may change the selected function to a visualization function that maps current locations of the vehicles.

In various embodiments, the pipeline engine 118 is configured to generate one or more pipelines of operations for the data based on the user's selection. A pipeline of operations may include one or more functions selected by the user. For example, the pipeline of operations may include one or more modification operations and/or visualization operations on one or more portions of data. The pipeline of operations may define an order in which the functions are applied to data. The pipeline of operations may include a linear pipeline or a branching pipeline. In some embodiments, the pipeline of operations may be dynamically generated. For example, the pipeline of operations may be updated/modified when users select a new function for inclusion in the pipeline. The pipeline of operations may be updated/modified when users remove a function from the pipeline. The pipeline of operations may be updated/modified when users change the ordering of functions within the pipeline. The pipeline of operations may be exported for use in a production pipeline, for analysis, for transformation, and/or other uses. In some embodiments, exporting pipeline of operations may include automatic removal of visualization operations/functions from the pipeline of operations. Visualization operations/functions may help a user to understand/see how different portions of the pipeline of operations work, but may not be needed in a workflow. For instance, such visualization functions may not be necessary in a production pipeline and may introduce unnecessary costs (e.g., processing power, processing time, power consumption, memory consumption) into the production pipeline. Automatic removal of visualization operations/functions may be facilitated by the step-by-step selection of operations/functions of pipeline as disclosed herein. The pipeline of operations may be modified to remove the visualization operations/functions. Automatic removal of visualization operations/functions may provide for an export of the pipeline that includes the non-visualization operations/functions within the pipeline.

In some embodiments, the pipeline of operations may be displayed on the pipeline creation interface. For example, the functions selected by users may be displayed within a portion of the pipeline creation interface, with the functions listed in a given order based on the users' selections. Users may use the displayed pipeline to make changes to the pipeline and/or the displayed functions. Users may use the displayed pipeline to add a new function (to the beginning, to the end, or within the pipeline), remove an existing function from the pipeline, or rearrange the order of the functions within the pipeline. Users may use the displayed pipeline to view information regarding the functions within the pipeline (e.g., properties of the function, arguments/variables of the functions, code of the functions, data transformations by the functions) and/or to modify the code of the functions within the pipelines.

Figure 2:
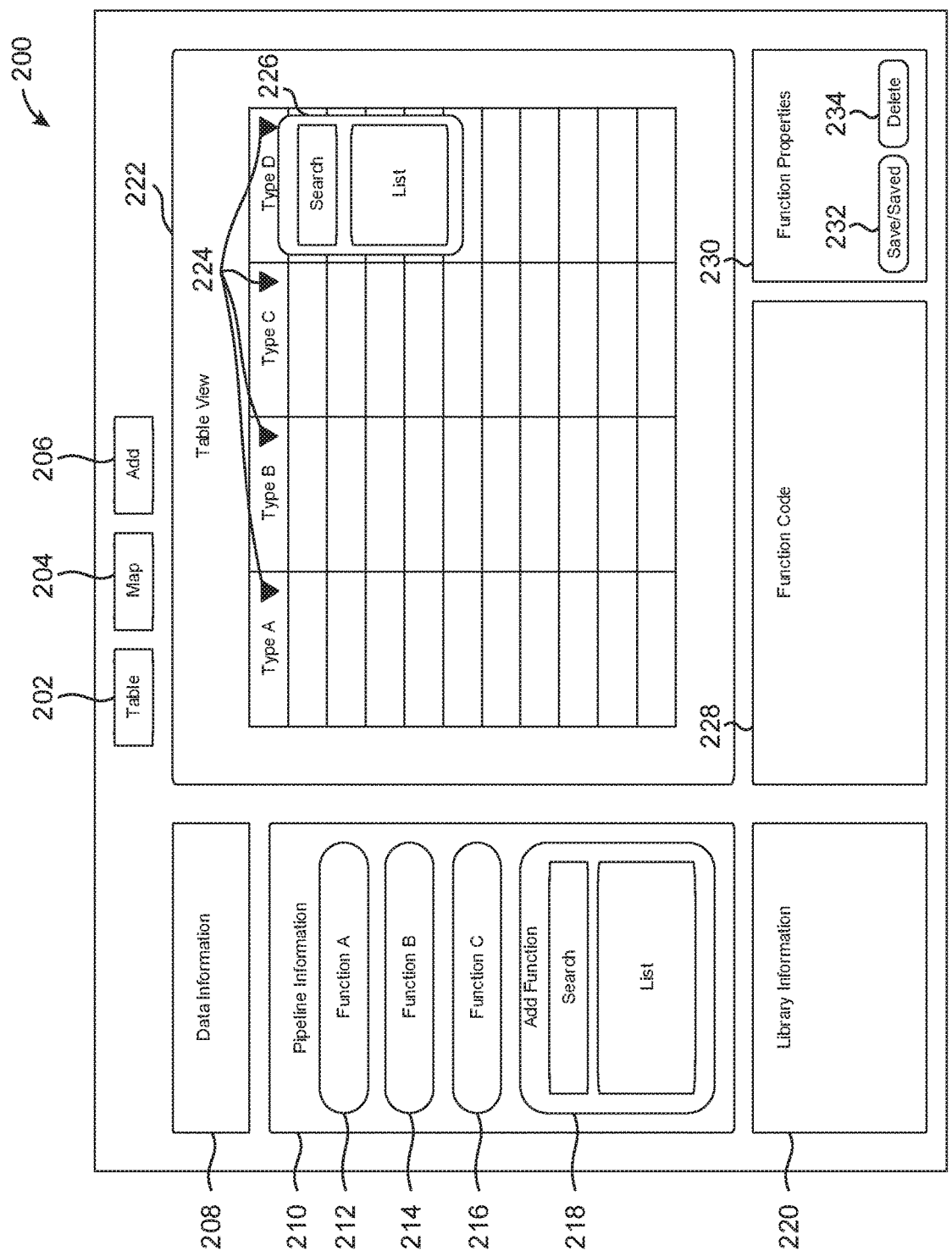
FIG. 2 illustrates an example interface for managing pipelines of operations on data, in accordance with various embodiments.
Figure 3:
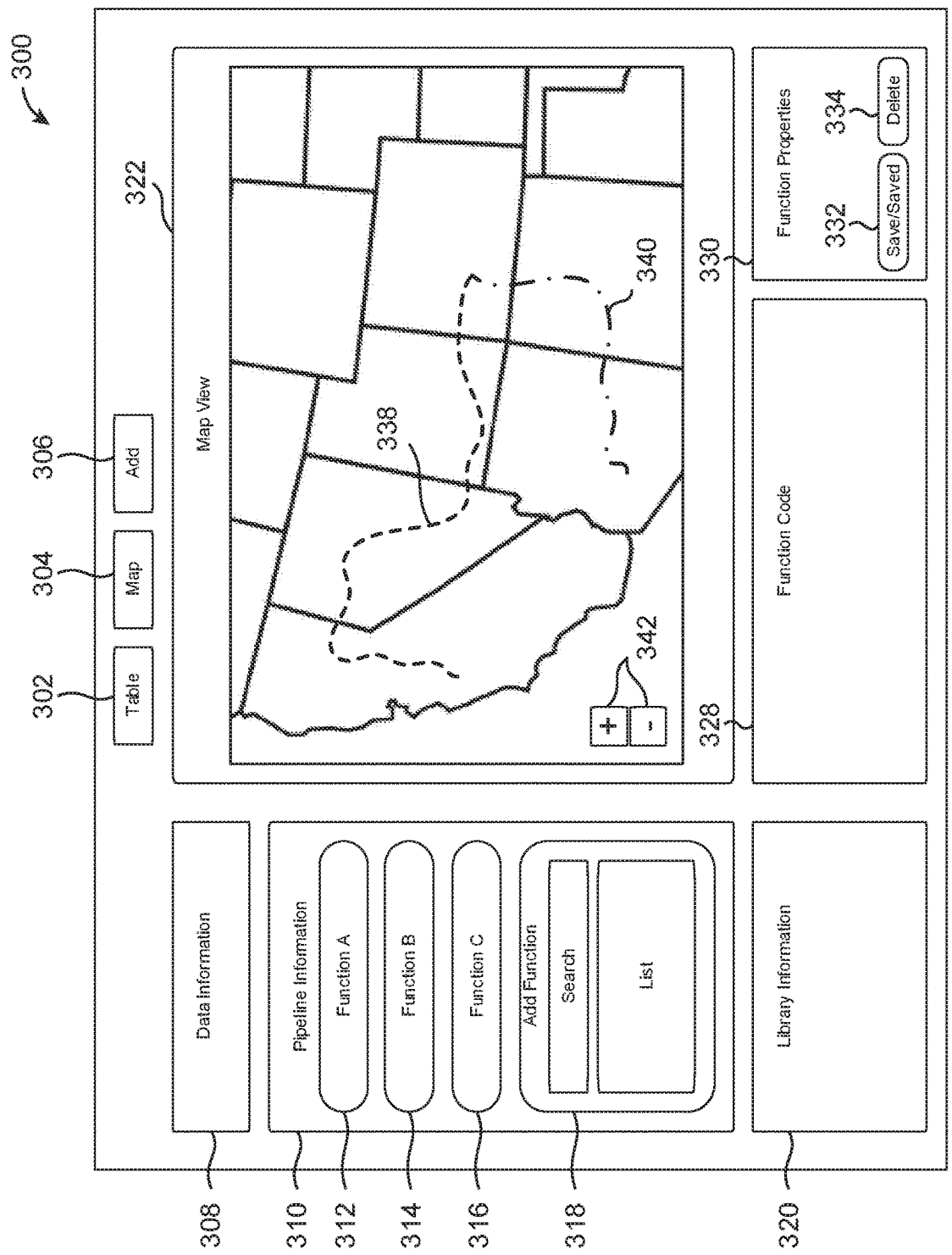
FIG. 3 illustrates an example interface for managing pipelines of operations on data, in accordance with various embodiments.

FIGS. 2-3 illustrate example user interfaces 200, 300 for managing pipeline of operations on data, in accordance with various embodiments. In various embodiments, the user interfaces 200, 300 may be accessed through a software application running on a computing device (e.g., computers, mobile phones, tablets, etc.) that includes one or more processors and memory. For example, the user interfaces 200, 300 may be accessible through a web browser. In another example, the user interfaces 200, 300 may be provided through a data analysis application. In yet another example, the user interfaces 200, 300 may be provided as a service over a network (e.g., software as a service). Depending on the computing device, the user may be able to interact with the user interfaces 200, 300 using various input devices (e.g., keyboard, mouse, etc.) and/or touch/gestures. The user interfaces 200, 300 are provided merely as examples and, naturally, the arrangement and configuration of such user interfaces can vary depending on the implementation. Thus, depending on the implementation, the user interfaces 200, 300 may include additional features and/or alternative features. The user interfaces 200, 300 may include/enable one or more functionalities of the interface(s) described above with respect to the computing system 102/components of the computing system 102.

Referring to FIG. 2, the user interface 200 may include viewing options 202, 204, 206. The viewing options 202, 204, 206 may enable users to select one or more types of view of data. For example, the viewing option 202 may enable users to view data in table form. The viewing option 204 may enable users to view data in map form. The viewing option 206 may enable users to add one or more types of view of data (e.g., table view, map view, histogram view, scatter plot view, wind rose chart view) to the user interface 200. One or more of the viewing options, such as the viewing option 204 to view data in map form, may be provided through one or more external functions and/or one or more user-defined functions. Such viewing options may be similar to an operation/function selected as part of a pipeline of operations. Such viewing options may utilize metadata that allows them to be used for visualization functions. A data information section 208 may provide information relating to accessed data. For example, the data information section 208 may provide information relating to title/name of data, the file path of the data, related data, group(s) to which the data belongs, properties/characteristics of data (e.g., number of rows and columns), and/or other information relating to the data.

A pipeline information section 210 may provide information relating to functions selected by users for inclusion in one or more pipelines. For example, function A 212, function B 214, and function C 216 listed in the pipeline information section 210 may be the functions selected by users for inclusion in a pipeline. An add function section 218 of the pipeline information section 210 may enable users to select functions for inclusion in the pipeline. For example, users may use a search field of the add function section 218 to find the desired function. The add function section 218 may list functions available for selection. The listed functions may include those functions that match the term(s) entered into the search field and/or functions included within one or more libraries. In some embodiments, the listing of functions may be arranged in a particular order/ranked to provide suggestions to users on which functions to select.

Users may be required to use the search field of the add function section 218 before users are allowed to create new functions. For example, a user may enter a term "MISC" into the search field. Based on the search term not returning any hits/based on the listed functions not including the user's desired function, the user may interact with the add function 218 section to create a new function. In some embodiment, the user may create a new function by pressing a certain button (e.g., ENTER) while in the search field. In some embodiment, the user may be presented with an interactive option (e.g., button) to engage to create a new function. Requiring the user to search for functions before allowing the user to create new function may reduce the likelihood of users recoding existing functions. In some embodiments, the name of the new function may default to the term (e.g., "MISC") entered into the search field. Users may code the new function using a new user interface or a part of the user interface 200. For example, users may code the new function via a function code section 218.

The pipeline information section 210 may enable users to select one or more functions to see the results of operation(s) of the selected function on data (via a view section 222). The pipeline information section 210 may enable users to select one or more functions to see the code of the selected function (via the function code section 228).

The pipeline information section 210 may enable users to change a pipeline based on interaction with the pipeline information section 210. Users may change the order of functions within the pipeline by interacting with the functions listed within the pipeline. For example, users may change the order of functions in the pipeline to the function A 212, the function C 216, and the function B 214 by dragging the function C 216 from bottom of the list to a position between the function A 212 and the function B 214. Users may similarly move the add function section 218 to a given location within the pipeline to add a new function to the pipeline at the given location. Users may remove one or more of the functions from the pipeline by interacting with the listed functions (e.g., dragging a given function out of the pipeline information section 210, interacting with a "remove" button associated with the given function). User may create a function from multiple functions listed within the pipeline information section 210. For example, users may select two or more of the functions 212, 214, 216 and select an option to create a new function from the selected functions.

A library information section 220 may provide information relating to available libraries/functions of available libraries. The library information section 220 may provide listing of functions within libraries. For example, the library information section 220 may enable users to select one or more libraries to see the functions within the selected librar(ies). The library information section 220 may enable users to select which libraries are searched when users use the search field of the add function section 218. The library information section 220 may enable users to import/export libraries for use.

A view section 222 may provide information on accessed data. The view section may provide views of the data based on user selection, such as based on users' interactions with the viewing options 202, 204, 206. In FIG. 2, users may have interacted with the viewing option 202 to view the data in table form. In some embodiments, one or more types of views may be presented as a default view of data. The table view of data may present data in tabular form. For example, the table view of data may provide data of different types in different columns (or different rows). The view section 222 may provide views of results of operation on the data. For example, responsive to users' selection of a given function in the pipeline information section 210, the view section 222 may provide a view of the data transformed based on the operation(s) of the given function.

The view section 222 may include options 224. The options 224 may enable users to select one or more functions, operations, configurations, and/or other settings relating to the corresponding portion of the data. For example, interacting with the option 224 in the column of data Type D may result in presentation of the portion section 226. The portion section 226 may display functions, operations, configurations, and/or other settings that may be used/set for the portion of the data in the column Type D. Users may use the search field of the portion section 226 to find the desired function, operation, configuration, and/or settings. For example, the portion section 226 may list functions available for selection. The listed functions may include those functions that match the term(s) entered into the search field and/or functions that may be applied to the column of data Type D. Functions that may be applied to the column of data Type D may include generic functions (applicable to multiple types of data) or type-specific functions (applicable to specific types of data). For example, based on the type D including numerical values or string values, different functions may be listed in the portion section 226. As another example, based on the numerical values of the column of data Type D being recorded in a particular measurement standard (e.g., metric vs standard system), different functions may be listed in the portion section 226. In some embodiments, the listing of functions may be ordered/ranked to provide suggestions to users on which functions to select.

The function code section 228 may provide views of code for one or more functions. The code displayed in the function code section 228 may include code of function(s) selected by users (e.g., via the pipeline information section 210/the portion section 226). The function code section 228 may enable users to create, modify, delete code of functions.

The function properties section 230 may provide view of properties (e.g., name, icon used to represent the function, parameters of the function, such as dataframes, variables of the function, variable types, inputs to function, outputs of function) of one or more functions. The properties displayed in the function properties section 230 may include properties of function(s) selected by users (e.g., via the pipeline information section 210/the portion section 226). The function properties section 230 may enable users to create, modify, delete properties of functions. For example, the function properties section 230 may enable users to specify data types of arguments of the function, may enable users to determine whether to restrict the type of data which may use the function, and/or may enable users to specify keywords and/or other characteristics of the function. Presentation and changes in other properties of functions/code of functions are contemplated.

The function properties section 230 may include options 232, 234 relating to saving/deleting code for functions. For example, based on a user accessing an existing function, the option 232 may indicate that the code of the function have been saved in memory/library. Based on the user modifying the code, the option 232 may indicate an option for the user to save the modified code. The option 232 may present users with options to overwriting the existing code of the function or to create a new function from the modified code. The delete option 234 may enable users to delete code for a function (e.g., delete exiting code, delete modified code).

In some embodiments, the user interface 200 may provide one or more warnings relating to code/properties of functions. For example, a given function changed by a user (via the function code section 228/the function properties section 230) may be used/referenced by other functions (related functions). A dependency graph may be generated and used to determine the impact of the change to the given function on the related functions. Information on the impact of the change to the given function on the related functions may be provided via the user interface 200. For example, the function properties section 230 may display that the changed code affects related functions (e.g., by identifying the number and/or identities of the related functions) and/or analysis in which the given function/related functions are used (e.g., by identifying the number and/or identities of the analysis). As another example, the option 232 may change (e.g., change in shape and/or color) to indicate that saving changes to the code will affect related functions/analysis.

FIG. 3 illustrates the user interface 300. In some embodiments, the user interface 300 may be configured to implement some, or all, of the functionalities of the user interface 200 as described above. The user interface 300 may include viewing options 302, 304, 306. The viewing options 302, 304, 306 may enable users to select one or more types of view of data. For example, the viewing option 302 may enable users to view data in table form. The viewing option 304 may enable users to view data in map form. The viewing option 306 may enable users to add one or more types of view of data (e.g., table view, map view, histogram view, scatter plot view, wind rose chart view) to the user interface 300. The data information section 308 may provide information relating to accessed data. For example, the data information section 308 may provide information relating to title/name of data, the file path of the data, related data, group(s) to which the data belongs, properties/characteristics of data (e.g., number of rows and columns), and/or other information relating to the data.

A pipeline information section 310 may provide information relating to functions selected by users for inclusion in one or more pipelines. For example, function A 312, function B 314, and function C 316 listed in the pipeline information section 310 may be the functions selected by users for inclusion in a pipeline. An add function section 318 of the pipeline information section 310 may enable users to select functions for inclusion in the pipeline. For example, users may use a search field of the add function section 318 to find the desired function. The add function section 318 may list functions available for selection. The listed functions may include those functions that match the term(s) entered into the search field and/or functions included within one or more libraries. In some embodiments, the listing of functions may be arranged in a particular order/ranked to provide suggestions to users on which functions to select.

Users may be required to use the search field of the add function section 318 before users are allowed to create new functions. For example, a user may enter a term "MISC" into the search field. Based on the search term not returning any hits/based on the listed functions not including the user's desired function, the user may interact with the add function 318 section to create a new function. In some embodiment, the user may create a new function by pressing a certain button (e.g., ENTER) while in the search field. In some embodiment, the user may be presented with an interactive option (e.g., button) to engage to create a new function. Requiring the user to search for functions before allowing the user to create new function may reduce the likelihood of users recoding existing functions. In some embodiments, the name of the new function may default to the term (e.g., "MISC") entered into the search field. Users may code the new function using a new user interface or a part of the user interface 300. For example, users may code the new function via a function code section 328.

The pipeline information section 310 may enable users to select one or more functions to see the results of operation(s) of the selected function on data (via a view section 322). The pipeline information section 310 may enable users to select one or more functions to see the code of the selected function (via the function code section 328).

The pipeline information section 310 may enable users to change a pipeline based on interaction with the pipeline information section 310. Users may change the order of functions within the pipeline by interacting with the functions listed within the pipeline. For example, users may change the order of functions in the pipeline to the function A 312, the function C 316, and the function B 314 by dragging the function C 316 from bottom of the list to a position between the function A 312 and the function B 314. Users may similarly move the add function section 318 to a given location within the pipeline to add a new function to the pipeline at the given location. Users may remove one or more of the functions from the pipeline by interacting with the listed functions (e.g., dragging a given function out of the pipeline information section 310, interacting with a "remove" button associated with the given function). User may create a function from multiple functions listed within the pipeline information section 310. For example, users may select two or more of the functions 312, 314, 316 and select an option to create a new function from the selected functions.

A library information section 320 may provide information relating to available libraries/functions of available libraries. The library information section 320 may provide listing of functions within libraries. For example, the library information section 320 may enable users to select one or more libraries to see the functions within the selected librar(ies). The library information section 320 may enable users to select which libraries are searched when users use the search field of the add function section 318. The library information section 320 may enable users to import/export libraries for use.

A view section 322 may provide information on accessed data. The view section may provide views of the data based on user selection, such as based on uses' interactions with the viewing options 302, 304, 306. In some embodiments, one or more types of views may be presented as a default view of data. In FIG. 3, users may have interacted with the viewing option 304 to view the data in map form. For example, the map view of the data in the view section 322 may provide views of routes 338, 340 taken by two vehicles. The view section 322 may include options 342 to change the extent of map presented within the view section 322. Users may interact with the options 342 and/or the map shown within the view section 322 to change how the map is presented. For example, users may drag the map to see different portions of the map, or select one or more of the routes 338, 340 to see information relating to the selected route(s).

In some embodiments, one or more types of views of data may be provided through one or more external functions. For example, responsive to users' selection of the viewing option 304, an external mapping function may be used to generate the map view shown in the view section 322. A given external functions may be used by importing the given external function, importing a library/portion of the library including the given external function, and/or providing inputs to the external function (e.g., the external library, external process) and receiving outputs of the external function.

The function code section 328 may provide views of code for one or more functions. The code displayed in the function code section 328 may include code of function(s) selected by users (e.g., via the pipeline information section 310/the portion section 326). The function code section 328 may enable users to create, modify, delete code of functions.

The function properties section 330 may provide view of properties (e.g., name, icon used to represent the function, parameters of the function, such as dataframes, variables of the function, variable types, inputs to function, outputs of function) of one or more functions. The properties displayed in the function properties section 330 may include properties of function(s) selected by users (e.g., via the pipeline information section 310/the portion section 326). The function properties section 330 may enable users to create, modify, delete properties of functions. For example, the function properties section 330 may enable users to specify data types of arguments of the function, may enable users to determine whether to restrict the type of data which may use the function, and/or may enable users to specify keywords and/or other characteristics of the function. Presentation and changes in other properties of functions/code of functions are contemplated.

The function properties section 330 may include options 332, 334 relating to saving/deleting code for functions. For example, based on a user accessing an existing function, the option 332 may indicate that the code of the function have been saved in memory/library. Based on the user modifying the code, the option 332 may indicate an option for the user to save the modified code. The option 332 may present users with options to overwriting the existing code of the function or to create a new function from the modified code. The delete option 334 may enable users to delete code for a function (e.g., delete exiting code, delete modified code).

In some embodiments, the user interface 300 may provide one or more warnings relating to code/properties of functions. For example, a given function changed by a user (via the function code section 328/the function properties section 330) may be used/referenced by other functions (related functions). A dependency graph may be generated and used to determine the impact of the change to the given function on the related functions. Information on the impact of the change to the given function on the related functions may be provided via the user interface 300. For example, the function properties section 330 may display that the changed code affects related functions (e.g., by identifying the number and/or identities of the related functions) and/or analysis in which the given function/related functions are used (e.g., by identifying the number and/or identities of the analysis). As another example, the option 332 may change (e.g., change in shape and/or color) to indicate that saving changes to the code will affect related functions/analysis.

Figure 4:
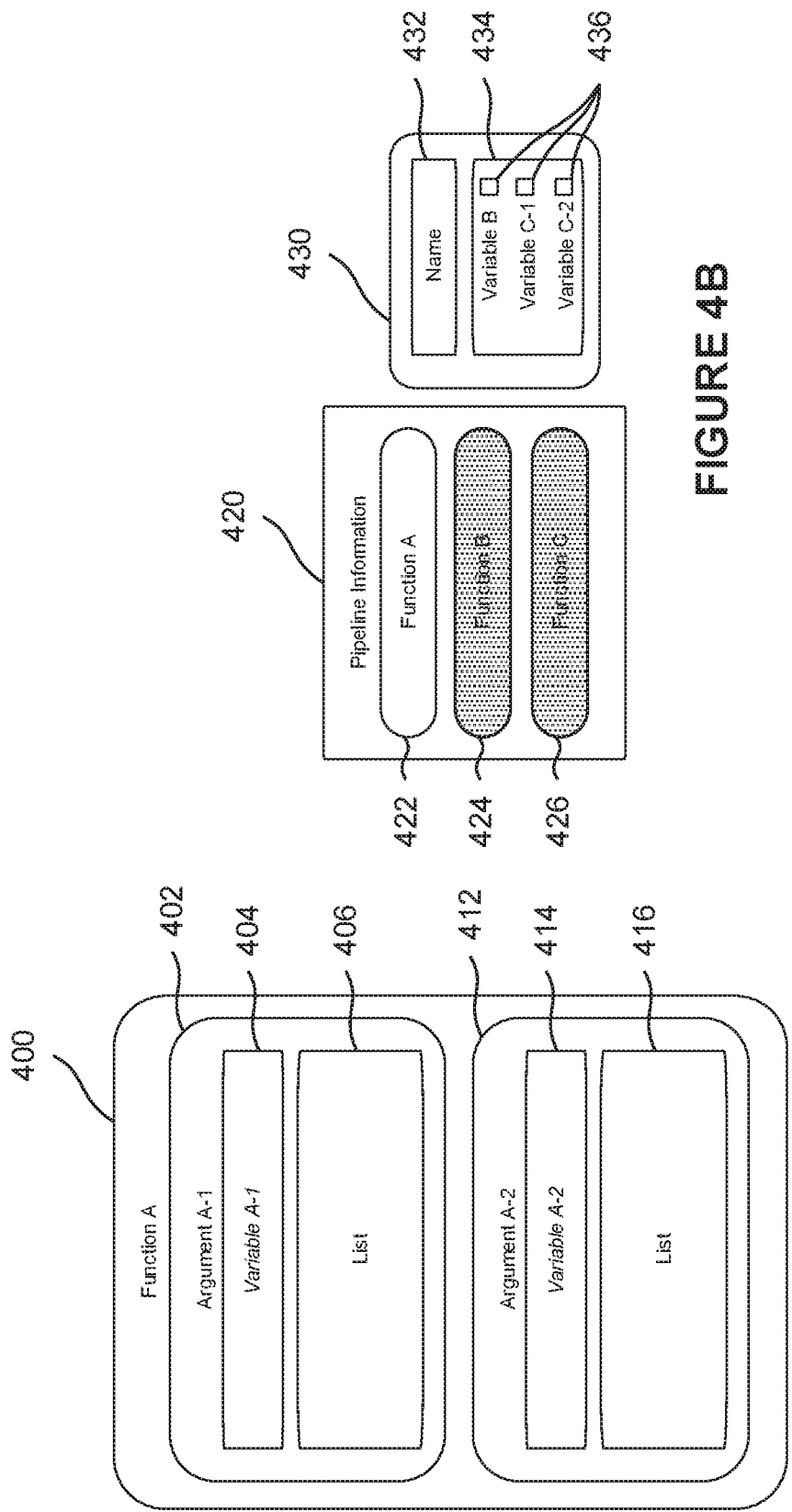
FIG. 4A illustrates an example interface for managing pipelines of operations on data, in accordance with various embodiments.
FIG. 4B illustrates an example interface for managing pipelines of operations on data, in accordance with various embodiments.

FIG. 4A illustrates an example interface 400 that provides assistance to users in using a function. For example, the interface 400 may provide assistance to users in using Function A. Function A may take two arguments (A-1, A-2) to perform its operation(s). Based on users' selection of Function A, the interface 400 may be presented to receive users' selection of data/portion of data for the arguments of Function A. For example, the Argument A-1 section 402 may receive users' selection of a portion of data (e.g., column, row) to be used for the argument A-1. The Argument A-1 section 402 may display suggestions for users' selection of the portion of the data in a box 404. For example, the box 404 may display the text of Variable A-1 that represent the argument A-1—based on the Variable A-1 being coded as "speed," the box 404 may display the text "speed." Displaying such information may enable users to select the appropriate portion of the data (e.g., column, row) to be used as the argument. As another example, the box 404 may display specific value (e.g., number, text) suggested for the argument. In some embodiments, the box 404 may include a search field enabling users to search for particular portions of the data (e.g., based on column/row names/properties). The box 406 may provide a listing of portions of data (e.g., column, row) which may be selected to be used for the argument. The portions of the data may be listed based on the argument. For example, based on the argument A-1 being associated with number type data may result in number type columns/rows being listed in the box 406. The portions of the data may listed be based on user input. For example, the portions of the data listed may be those portions matching user inputs into the search field. In some embodiments, the listing of portions of the data in the box 406 may be ordered/ranked to suggest particular portion(s) for selection by users.

Responsive to the user's selection of a given portion of data using the Argument A-1 section 402, the Argument A-2 section 412 may be displayed to receive users' selection of a portion of data to be used for the argument A-2. The Argument A-2 section 412 may operate for argument A-2 as the Argument A-1 section 402 operates as described above for argument A-1. The box 414 may operate for argument A-2 as the box 404 operates as described above for argument A-1. The box 416 may operate for argument A-2 as the box 406 operates as described above for argument A-1. In some embodiments, one or more of the boxes 414, 416 may operate differently based on users' selection of data for argument A-1 using the Argument A-1 section 402. For example, based on users' selection of different columns/rows (e.g., columns/rows of different types of data) for the Argument A-1, the boxes 414, 416 may operate differently to provide different suggestions.

FIG. 4B illustrates an example interface 430 that provides assistance to users in generating a new combined function from multiple functions. A pipeline information section 420 may display functions (function A 422, function B 424, function C 426) selected by users for inclusion in a pipeline of operations. Users may select two or more of the functions 422, 424, 426 and select an option to create a new combined function from the selected function. Based on users' selection to create a new combined function from existing functions, the interface 430 may be displayed. The interface 430 may include a name field 432 enabling users to provide a name/title for the new combined function. The function properties section 434 may display information relating to properties of the selected functions. For example, based on a user's selection of the function B 424 and the function C 426 for inclusion in a new combined function, the function properties section 434 may display properties of the selected functions, such as variables of the functions (variable B, variable C-1, variable C-2) used to define arguments for the functions. The function properties section 434 may provide options 436 enabling the user to modify the variables (e.g., determine whether a given argument will be set to a specific value in the new combined function; determine whether the given argument will be selectable by users when using the new combined function; determine whether to change the variable/argument in the new combined function).

Figure 5:
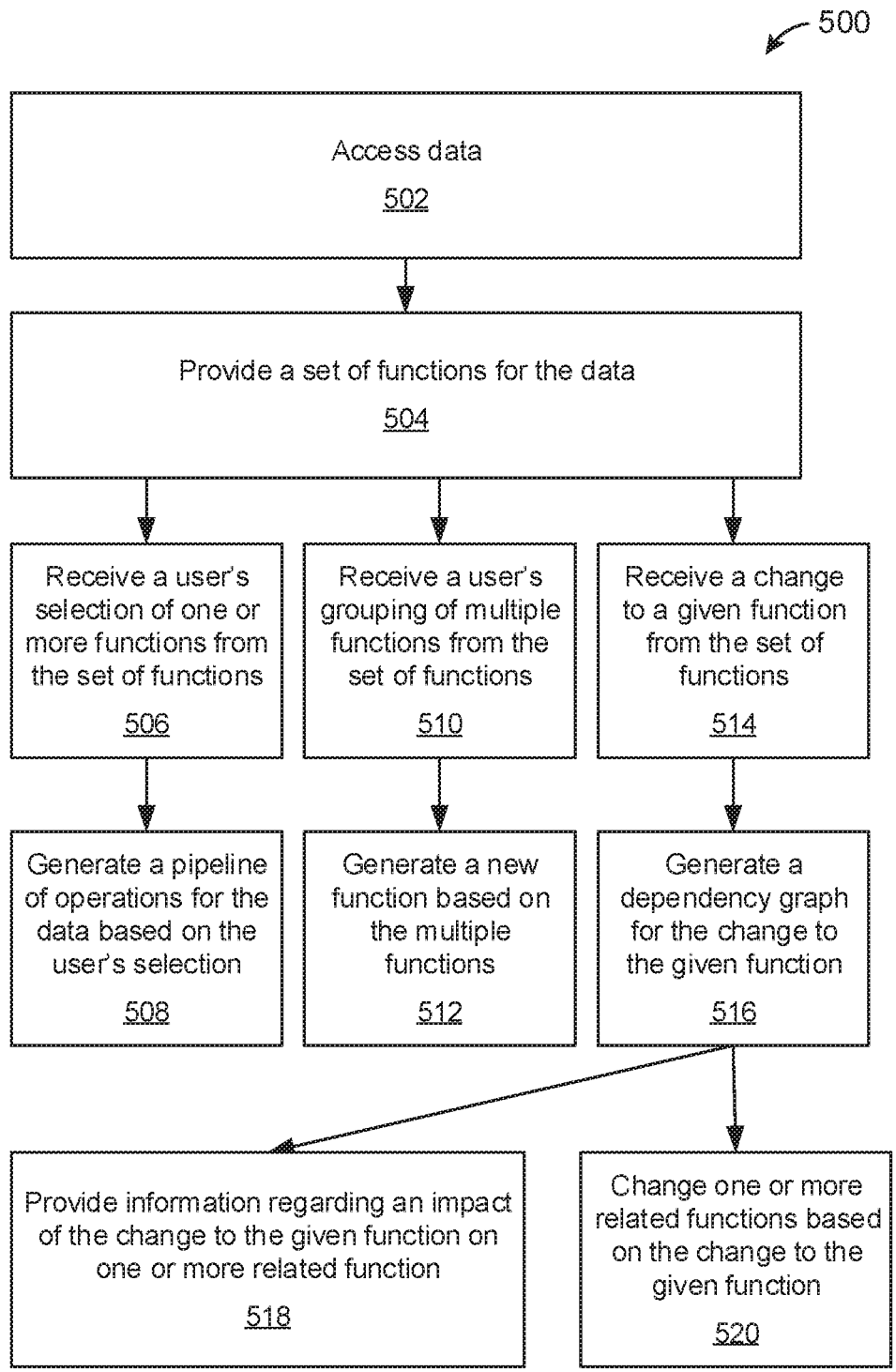
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, data may be accessed. At block 504, a set of functions for the data may be provided. At block 506, a user's selection of one or more functions from the set of functions may be received. At block 508, a pipeline of operations for the data may be generated based on the user's selection. The pipeline of operations may include the function(s) selected by the user. At block 510, a user's grouping of multiple functions from the set of functions may be received. At block 512, a new function may be generated based on the multiple functions. At block 514, a change to a given function from the set of functions may be received. At block 516, a dependency graph may be generated for the change to the given function. At block 518, information regarding an impact of the change to the given function on one or more related functions may be provided. At block 520, one or more related functions may be changed based on the change to the given function.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
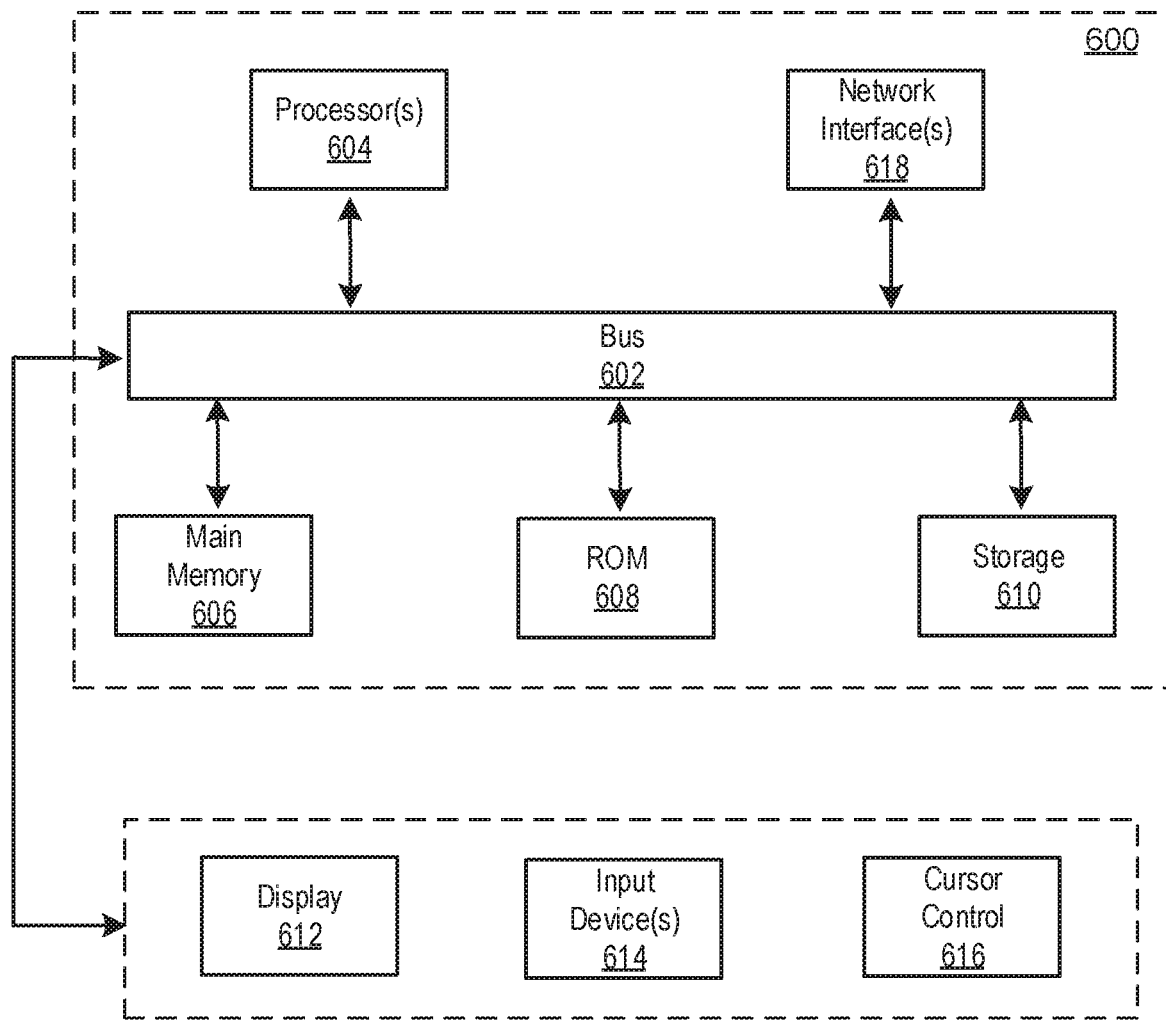
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software code that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method, comprising:
   providing, via a pipeline creation interface, access to a set of functions, each function configured to perform one or more operations on data;
   receiving, via the pipeline creation interface, a selection of a plurality of functions of the set of functions, the plurality of functions comprising a grouping of multiple functions from the set of functions;
   generating a new function based on the grouping of multiple functions, wherein generating the new function comprises automatically generating raw code for the new function that includes at least one of portions of raw code of the multiple functions or references to the raw code of the multiple functions; and
   generating a pipeline of operations for the data based at least in part on the new function and one or more of the selected plurality of functions.

2. The method of claim 1, wherein the one or more operations include at least one of a data modification operation that modifies at least a portion of the data or a data visualization operation that generates a particular type of visualization of the data.

3. The method of claim 1, further comprising:
   determining a set of operations permitted to be performed on the data; and
   determining the set of functions at least in part by determining each function configured to perform at least one operation in the set of operations permitted to be performed on the data.

4. The method of claim 3, wherein the data is first data and the set of operations permitted to be performed on the data includes a first data visualization operation that generates a first type of visualization of the first data, the method further comprising:
   generating the first type of visualization of the first data using the first data visualization operation; and
   including the first data visualization operation in the set of operations permitted to be performed on the first data.

5. The method of claim 4, wherein the set of operations permitted to be performed on the data is a first set of operations permitted to be performed on the data, the method further comprising:
   identifying second data;
   generating the first type of visualization of the second data using the first data visualization operation and generating a second type of visualization of the second data using the second data visualization operation; and
   including the first data visualization operation and the second data visualization operation in a second set of operations permitted to be performed on the second data.

6. The method of claim 1, further comprising:
   updating the raw code of the new function based at least in part on changes to the raw code of the multiple functions.

7. The method of claim 1, wherein providing access to the set of functions comprises suggesting the set of functions based on the data or a historical usage of the set of functions.

8. The method of claim 7, wherein suggesting the set of functions comprises ranking the set of functions according to a historical likelihood of use for a data type of the data or a frequency of prior use of the set of functions.

9. The method of claim 1, wherein the data is first data, and wherein execution of the instructions further cause the system to perform:
   determining that second data is historically used with the first data by a particular function at least a threshold number of times; and
   suggesting, via the pipeline creation interface, that the second data be used as an argument of the particular function.

10. A system comprising:
    one or more processors;
    memory storing instructions that, when executed by the one or more processors, cause the system to perform:
       providing, via a pipeline creation interface, access to a set of functions, each function configured to perform one or more operations on data;

receiving, via the pipeline creation interface, a selection of a plurality of functions of the set of functions, the plurality of functions comprising a grouping of multiple functions from the set of functions;

generating a new function based on the grouping of multiple functions, wherein generating the new function comprises automatically generating raw code for the new function that includes at least one of portions of raw code of the multiple functions or references to the raw code of the multiple functions; and generating a pipeline of operations for the data based at least in part on the new function and one or more of the selected plurality of functions.

11. The system of claim 10, wherein the one or more operations include at least one of a data modification operation that modifies at least a portion of the data or a data visualization operation that generates a particular type of visualization of the data.

12. The system of claim 10, wherein execution of the instructions further causes the system to perform:
determining a set of operations permitted to be performed on the data; and
determining the set of functions at least in part by determining each function configured to perform at least one operation in the set of operations permitted to be performed on the data.

13. The system of claim 12, wherein the data is first data and the set of operations permitted to be performed on the data includes a first data visualization operation that generates a first type of visualization of the first data, and wherein execution of the instructions further causes the system to perform:
generating the first type of visualization of the first data using the first data visualization operation; and
including the first data visualization operation in the set of operations permitted to be performed on the first data.

14. The system of claim 13, wherein the set of operations permitted to be performed on the data is a first set of operations permitted to be performed on the data, and wherein execution of the instructions further causes the system to perform:
identifying second data;
generating the first type of visualization of the second data using the first data visualization operation and generating a second type of visualization of the second data using the second data visualization operation; and
including the first data visualization operation and the second data visualization operation in a second set of operations permitted to be performed on the second data.

15. The system of claim 10, wherein execution of the instructions further causes the system to perform:
updating the raw code of the new function based at least in part on changes to the raw code of the multiple functions.

16. The system of claim 10, wherein providing access to the set of functions comprises suggesting the set of functions based on the data or a historical usage of the set of functions.

17. The system of claim 16, wherein suggesting the set of functions comprises ranking the set of functions according to a historical likelihood of use for a data type of the data or a frequency of prior use of the set of functions.

18. The system of claim 16, wherein suggesting the set of functions comprises suggesting one or more parameters for at least one function.

19. The system of claim 10, wherein the data is first data, and wherein execution of the instructions further cause the system to perform:
determining that second data is historically used with the first data by a particular function at least a threshold number of times; and
suggesting, via the pipeline creation interface, that the second data be used as an argument of the particular function.

20. The system of claim 10, wherein execution of the instructions further cause the system to perform:
receiving a change to a given function from the set of functions, the given function used in one or more related functions;
generating a dependency graph for the change to the given function;
providing, via the pipeline creation interface, information regarding an impact of the change to the given function on the one or more related functions based on the dependency graph; and
changing the one or more related functions based on the change to the given function.

* * * * *